United States Patent
Takagi et al.

(10) Patent No.: US 11,143,327 B2
(45) Date of Patent: *Oct. 12, 2021

(54) COOLING APPARATUS FOR INTERNAL COMBUSTION ENGINE

(71) Applicants: TOYOTA JIDOSHA KABUSHIKI KAISHA, Toyota (JP); AISIN SEIKI KABUSHIKI KAISHA, Kariya (JP)

(72) Inventors: Noboru Takagi, Toyota (JP); Hirokazu Kato, Nisshin (JP); Rihito Kaneko, Miyoshi (JP); Naoto Hisaminato, Toyota (JP); Hirokazu Ando, Seto (JP); Masaaki Yamaguchi, Okazaki (JP); Hirotaka Watanabe, Anjo (JP); Takahiko Aoyagi, Anjo (JP); Masahiro Yoshida, Toyota (JP); Koji Nunami, Nagoya (JP); Naoto Yumisashi, Nagoya (JP); Masafumi Yoshida, Konan (JP)

(73) Assignees: TOYOTA JIDOSHA KABUSHIKI KAISHA, Toyota (JP); AISIN SEIKI KABUSHIKI KAISHA, Kariya (JP)

( * ) Notice: Subject to any disclaimer, the term of this patent is extended or adjusted under 35 U.S.C. 154(b) by 69 days.

This patent is subject to a terminal disclaimer.

(21) Appl. No.: 16/660,146

(22) Filed: Oct. 22, 2019

(65) Prior Publication Data

US 2020/0158254 A1    May 21, 2020

(30) Foreign Application Priority Data

Nov. 19, 2018  (JP) .............................. JP2018-216160

(51) Int. Cl.
*F16K 31/163* (2006.01)
*F16K 17/36* (2006.01)
(Continued)

(52) U.S. Cl.
CPC ............ *F16K 31/1635* (2013.01); *F01P 7/14* (2013.01); *F02F 1/14* (2013.01); *F16K 17/363* (2013.01); *F01P 2007/146* (2013.01)

(58) Field of Classification Search
CPC ...... F16K 31/1635; F16K 17/363; F01P 7/14; F01P 7/16; F01P 7/164; F01P 7/165;
(Continued)

(56) References Cited

U.S. PATENT DOCUMENTS

| 4,423,705 A | * | 1/1984 | Morita | ...................... F01P 5/12 |
| | | | | 123/41.02 |
| 5,975,031 A | * | 11/1999 | Bartolazzi | ............... F01P 7/164 |
| | | | | 123/41.02 |

(Continued)

FOREIGN PATENT DOCUMENTS

| DE | 19831901 A1 | * | 1/2000 | ................ F01P 5/10 |
| DE | 202011002336 U1 | * | 6/2011 | ................ F01P 7/14 |

(Continued)

OTHER PUBLICATIONS

Mar. 30, 2021 Office Action issued in U.S. Appl. No. 16/660,211.
(Continued)

*Primary Examiner* — Grant Moubry
(74) *Attorney, Agent, or Firm* — Oliff PLC

(57) ABSTRACT

A cooling apparatus includes a circulation circuit, a pump, a flow rate adjustment valve, and a controller. The flow rate adjustment valve includes a valve member that rotates to change an open degree of the flow rate adjustment valve and a stopper that moves between a restriction position and a retraction position. The controller is configured to execute, when maintaining the open degree of the flow rate adjustment, a preparatory process of moving the stopper to the restriction position after arranging the stopper at the retraction position and arranging the valve member further in the (Continued)

valve-closing direction than the stopper through control of the pump discharge amount.

10 Claims, 5 Drawing Sheets

(51) Int. Cl.
    *F01P 7/14*     (2006.01)
    *F02F 1/14*     (2006.01)

(58) Field of Classification Search
    CPC .......... F01P 5/10; F01P 2007/146; F02F 1/14; F02F 1/36
    See application file for complete search history.

(56) References Cited

U.S. PATENT DOCUMENTS

| | | | |
|---|---|---|---|
| 6,152,088 A * | 11/2000 | Occella | F01P 7/164 123/41.01 |
| 8,408,168 B2 | 4/2013 | Suzuki et al. | |
| 8,695,542 B2 | 4/2014 | Vacca et al. | |
| 9,109,497 B2 * | 8/2015 | Matsusaka | F16K 31/0651 |
| 9,243,545 B2 * | 1/2016 | Quix | F01P 7/14 |
| 9,500,115 B2 * | 11/2016 | Quix | F01P 3/02 |
| 10,337,389 B2 * | 7/2019 | Quix | F16K 11/076 |
| 2003/0136357 A1 * | 7/2003 | Kobayashi | F01P 7/167 123/41.08 |
| 2004/0035194 A1 | 2/2004 | Wakahara | |
| 2006/0005789 A1 * | 1/2006 | Miura | F01P 7/16 123/41.1 |
| 2010/0050960 A1 | 3/2010 | Araki et al. | |
| 2010/0083916 A1 | 4/2010 | Shintani et al. | |
| 2010/0212612 A1 * | 8/2010 | Vacca | F01P 11/16 123/41.09 |
| 2012/0103283 A1 * | 5/2012 | Mehring | F01P 3/02 123/41.02 |
| 2012/0266828 A1 | 10/2012 | Araki et al. | |
| 2013/0020513 A1 * | 1/2013 | Matsusaka | F01P 7/165 251/63.6 |
| 2014/0007824 A1 * | 1/2014 | Hayashi | F01P 7/167 123/41.01 |
| 2014/0137817 A1 * | 5/2014 | Komuro | F16K 31/0658 123/41.08 |
| 2016/0348567 A1 | 12/2016 | Watanabe et al. | |
| 2016/0376977 A1 | 12/2016 | Watanabe | |
| 2020/0158000 A1 | 5/2020 | Yoshida et al. | |

FOREIGN PATENT DOCUMENTS

| | | | | |
|---|---|---|---|---|
| EP | 2876274 A1 * | 5/2015 | | F01P 7/164 |
| JP | S56-19116 A | 2/1981 | | |
| JP | H06-142225 A | 5/1994 | | |
| JP | 2006-029113 A | 2/2006 | | |
| JP | 2006-090226 A | 4/2006 | | |
| JP | 2015-124768 A | 7/2015 | | |
| JP | 6225949 B2 | 11/2017 | | |
| WO | 00/04283 A1 | 1/2000 | | |

OTHER PUBLICATIONS

English machine translation of description for DE 202011002336 U1 provided by ESPACENET (Year: 2021).
Jul. 27, 2021 Notice of Allowance issued in U.S. Appl. No. 16/660,211.

* cited by examiner

COOLING APPARATUS FOR INTERNAL COMBUSTION ENGINE

1. FIELD

The present invention relates to a cooling apparatus for a water-cooled internal combustion engine.

2. DESCRIPTION OF RELATED ART

Japanese Laid-Open Patent Publication No. 2015-124768 discloses an example of a cooling apparatus, in which a flow rate adjustment valve is arranged at a passage for coolant circulating in the internal combustion engine. The flow rate adjustment valve includes a swing-type valve member. The valve member rotates when pushed by the coolant flowing through the passage for coolant.

The flow rate adjustment valve cannot maintain the rotation angle of the valve member, that is, the open degree of the flow rate adjustment valve.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A cooling apparatus for an internal combustion engine according to one aspect includes a circulation circuit for coolant flowing through the internal combustion engine, a pump arranged on the circulation circuit, the pump being configured to change a discharge amount of coolant, a flow rate adjustment valve arranged on the circulation circuit in series with the pump, and a controller configured to control a pump discharge amount that is the discharge amount of coolant in the pump. The flow rate adjustment valve includes a valve member configured to rotate to change an open degree of the flow rate adjustment valve and a stopper that moves between a restriction position at which the stopper engages with the valve member to restrict rotation of the valve member and a retraction position at which the stopper does not engage with the valve member and the rotation of the valve member is permitted. The valve member is configured to rotate in a valve-opening direction that is a rotation direction in which the open degree increases when a pressure difference increases between a position upstream of the valve member and a position downstream of the valve member in a flow direction of coolant in the circulation circuit and rotate in a valve-closing direction that is a rotation direction in which the open degree decreases when the pressure difference decreases. The controller is configured to execute, when maintaining the open degree, a preparatory process of moving the stopper to the restriction position after arranging the stopper at the retraction position and arranging the valve member further in the valve-closing direction than the stopper through control of the pump discharge amount.

In the above-described configuration, when the pressure difference between the position upstream of the valve member and the position downstream of the valve member in the flow direction of coolant in the circulation circuit is increased by increasing the pump discharge amount, the valve member rotates in the valve-opening direction and the open degree of the flow rate adjustment valve increases. In contrast, when the pressure difference is decreased by decreasing the pump discharge amount, the valve member rotates in the valve-closing direction and the open degree of the flow rate adjustment valve decreases. That is, the open degree of the flow rate adjustment valve can be adjusted by controlling the pump discharge amount.

Further, to maintain the open degree of the flow rate adjustment valve, the preparatory process is executed. Upon the execution of the preparatory process, the stopper is arranged at the retraction position, and the valve member is arranged further in the valve-closing direction than the stopper. This moves the stopper to the restriction position. At the point in time the preparatory process ends, the valve member is arranged in the valve-closing direction than the stopper, and the stopper is arranged at the restriction position. Thus, when the pump discharge amount increases and the pressure difference increases in this state, the valve member engages with the stopper even if the valve member attempts to rotate in the valve member. This restricts further rotation of the valve member in the valve-opening direction and consequently maintains the open degree of the flow rate adjustment valve. When the valve member is engaged with the stopper in such a manner, the rotation angle of the valve member (i.e., the open degree of the flow rate adjustment valve) cannot be maintained even if the pump discharge amount increases.

Thus, the open degree of the flow rate adjustment valve can be maintained by maintaining the rotation angle of the valve member.

In the above-described cooling apparatus, the flow rate adjustment valve includes a valve member biasing component that biases the valve member in the valve-closing direction, a valve accommodation portion that is part of the circulation circuit and accommodates the valve member, a stopper accommodation chamber separated from the valve accommodation portion by a partition wall, and an insertion portion arranged in the partition wall. The insertion portion connects the valve accommodation portion and the stopper accommodation chamber to each other, the stopper is inserted through the insertion portion. The flow rate adjustment valve also includes a connection passage connecting the stopper accommodation chamber to a portion of the circulation circuit located upstream of the valve member in the flow direction of coolant. The stopper moves toward the restriction position when pressure in the communication passage increases and moves toward the retraction position when the pressure in the communication passage decreases.

In the above-described configuration, when the pump discharge amount increases, the valve-opening direction rotates in the valve-opening direction against the biasing force of the valve member biasing component. In contrast, when the pump discharge amount decreases, the valve member rotates in the valve-closing direction with the biasing force of the valve member biasing component. Further, when the pump discharge amount increases, an increase occurs in the pressure at the portion of the circulation circuit located upstream of the valve member in the flow direction of coolant. As a result, since the pressure in the connection passage connected to the upstream portion becomes high, the stopper protrudes into the valve member accommodation portion through the insertion portion. That is, the stopper can be arranged at the restriction position. When the pump discharge amount decreases with the stopper located at the restriction position, the pressure at the upstream portion decreases. As a result, since the pressure in the connection passage decreases, the stopper moves toward the retraction position and then moves out of the valve member accommodation portion. That is, the stopper moves to the retraction position. Thus, in the above-described configuration, controlling the pump discharge amount allows the stopper to move between the retraction position and the restriction position.

Further, in the above-described cooling apparatus, the flow rate adjustment valve includes a stopper biasing component that biases the stopper toward the retraction position. In this cooling apparatus, the stopper is located at the retraction position when the pressure in the communication passage is less than or equal to a first pressure and located at the restriction position against a biasing force of the stopper biasing component when the pressure in the communication passage is greater than or equal to a second pressure that is higher than the first pressure.

In the above-described configuration, when the pressure in the connection passage is decreased to the first pressure or lower by controlling the pump discharge amount, the stopper is moved to the retraction position by the biasing force produced from the stopper biasing component. That is, the stopper can be maintained at the retraction position by maintaining the pressure in the connection passage at the first pressure or lower through the control of the pump discharge amount. When the pressure in the connection passage is increased from the first pressure or lower to the second pressure or higher by controlling the pump discharge amount, the stopper is moved from the retraction position to the restriction position against the biasing force produced from the stopper biasing component. Thus, the stopper can be maintained at the restriction position by maintaining the pressure in the connection passage at the second pressure or higher through the control of the pump discharge amount. That is, the pressure in the connection passage for arranging the stopper biasing component at the restriction position is differentiated from the pressure in the connection passage for arranging the stopper at the retraction position. This improves the operability of the stopper through the control of the pump discharge amount.

In the above-described cooling apparatus, the valve member biasing component is configured to rotate the valve member to a position further in the valve-closing direction than the stopper when the pressure difference between the position upstream of the valve member and the position downstream of the valve member in the flow direction of coolant in the circulation circuit becomes less than or equal to a set pressure difference. In this cooling apparatus, the pressure difference between the position upstream of the valve member and the position downstream of the valve member in the flow direction of coolant is less than or equal to the set pressure difference when the pump discharge amount is less than or equal to a first discharge amount. In addition, when the pump discharge amount changes from a value larger than the first discharge amount to a value less than or equal to the first discharge amount, the pressure in the connection passage becomes less than or equal to the first pressure before the pressure difference becomes less than or equal to the set pressure difference.

In the above-described configuration, when the preparatory process is executed, the pump discharge amount decreases to the first discharge amount or lower. This moves the stopper to the retraction position and then causes the valve member rotating in the valve-closing direction to pass through the restriction position. That is, the stopper is not prevented from rotating to a position further in the valve-closing direction than the stopper.

The controller may be configured to, in the preparatory process, arrange the stopper at the retraction position and arrange the valve member further in the valve-closing direction than the stopper by decreasing the pump discharge amount to the first discharge amount or lower and then move the stopper from the retraction position to the restriction position by increasing the pump discharge amount to a second discharge amount that is larger than the first discharge amount.

In the above-described configuration, when the preparatory process is executed, the pump discharge amount decreases to the first discharge amount or lower. Thus, the stopper is arranged at the retraction position, and then the valve member is located at a position further in the valve-closing direction than the stopper. Subsequently, the stopper is moved from the retraction position to the restriction position by increasing the pump discharge amount to the second discharge amount. Thus, the valve member is arranged at a position further in the valve-closing direction than the stopper, and the stopper is located at the restriction position. Thus, even if the pump discharge amount is increased in this state, the valve member engages with the stopper to restrict further rotation of the valve member in the valve-opening direction. As a result, the open degree of the flow rate adjustment valve can be maintained.

Further, the controller may be configured to execute, when cancelling a state in which the open degree is maintained, a cancellation process of arranging the stopper at the retraction position by decreasing the pump discharge amount to the first discharge amount or lower and then changing the pump discharge amount from a value less than or equal to the first discharge amount to a third discharge amount that is larger than the second discharge amount.

In the above-described configuration, when the cancellation process is executed, the pump discharge amount decreases to the first discharge amount or lower. Thus, the stopper is arranged at the retraction position. That is, the valve member no longer engages with the stopper. In this state, the pump discharge amount is changed from a value less than or equal to the first discharge amount to the third discharge amount.

An increase speed in the pressure difference between the position upstream of valve member and the position downstream of valve member in the flow direction of coolant in the circulation circuit when the cancellation process is executed to change a value less than or equal to the first discharge amount to the third discharge amount is defined as a cancellation increase speed. Further, an increase speed of the pressure difference when the pump discharge amount is changed from a value less than or equal to the first discharge amount to the second discharge amount is defined as a restriction increase speed. The increase speed of the pressure difference caused by an increase in the pump discharge amount becomes large more easily as the degree of increase in the pump discharge amount becomes larger. The difference between the first discharge amount and the third discharge amount is larger than the difference between the first discharge amount and the second discharge amount. Thus, the cancellation increase speed increases more easily than the restriction increase speed.

Increasing the pressure difference rotates the valve member in the valve-opening direction. The higher the increase speed of the pressure difference becomes, the more easily the rotation speed of the valve member increases. That is, when the cancellation process is executed, the pressure difference immediately increases. This increases the rotation speed of the valve member rotating in the valve-opening direction. As a result, before the stopper moves from the retraction position to the restriction position, the valve member is rotated to a position further in the valve-opening direction than the stopper. Thus, after the cancellation process is ended, the open degree of the flow rate adjustment valve (i.e., the rotation angle of the valve member) is adjusted by adjusting the pressure difference through the control of the pump discharge amount.

An increase speed of the pressure difference between the position upstream of the valve member and the position downstream of the valve member in the flow direction of coolant in the circulation circuit when the preparatory process is executed to increase the pump discharge amount to the second discharge amount is defined as a restriction increase speed. The controller is configured to execute, when cancelling a state in which the open degree is maintained, a cancellation process of arranging the stopper at the retraction position by decreasing the pump discharge amount to the first discharge amount or lower and then increasing the pressure difference at an increase speed that is higher than the restriction increase speed by increasing the pump discharge amount.

In the above-described configuration, the increase speed of the pressure difference when the cancellation process is executed to increase the pump discharge amount is higher than the restriction increase speed. This increases the rotation speed of the valve member rotating in the valve-opening direction. As a result, before the stopper moves from the retraction position to the restriction position, the valve member is rotated to a position further in the valve-opening direction than the stopper. Thus, after the cancellation process is ended, the open degree of the flow rate adjustment valve (i.e., the rotation angle of the valve member) is adjusted by adjusting the pressure difference through the control of the pump discharge amount.

The above-described cooling apparatus includes a restriction portion arranged upstream of the stopper in the flow direction of coolant in the circulation circuit. The restriction portion restricts further rotation of the valve member in the valve-closing direction by engaging with the valve member that has rotated in the valve-closing direction.

In the above-described configuration, when the pump discharge amount decreases to a value less than or equal to the first discharge amount, the valve member rotates in the valve-closing direction. When the valve member and the restriction portion engage with each other, further rotation of the valve member in the valve-closing direction is restricted. Thus, when the pump discharge amount is controlled to a value less than or equal to the first discharge amount, valve member is prevented from moving far away from the stopper.

The above-described cooling apparatus includes a radiator arranged on the circulation circuit in series with the pump and the flow rate adjustment valve and a bypass passage through which coolant flows so as to bypass the radiator and the flow rate adjustment valve. In this configuration, adjusting the open degree of the flow rate adjustment valve controls the amount of coolant passing through the radiator and consequently adjusts the temperature and the circulation amount of coolant circulating in the circulation circuit.

In this case, the controller may be configured to restrict rotation of the valve member in the valve-opening direction with the stopper by arranging the stopper at the restriction position when a warm-up operation of the internal combustion engine is not complete. In this configuration, when the warm-up operation of the internal combustion engine is incomplete, the temperature of coolant can be increased at an early stage by maintaining the open degree of the flow rate adjustment valve.

The controller may be configured to adjust the open degree by controlling the pump discharge amount when the warm-up operation of the internal combustion engine is complete. In this configuration, after the warm-up operation is complete, the temperature of coolant during the engine operation and the amount of coolant flowing through the circulation circuit can be controlled by adjusting the open degree.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A cooling apparatus 20 for an internal combustion engine 10 according to an embodiment will now be described with reference to FIGS. 1 to 8.

Figure 1:
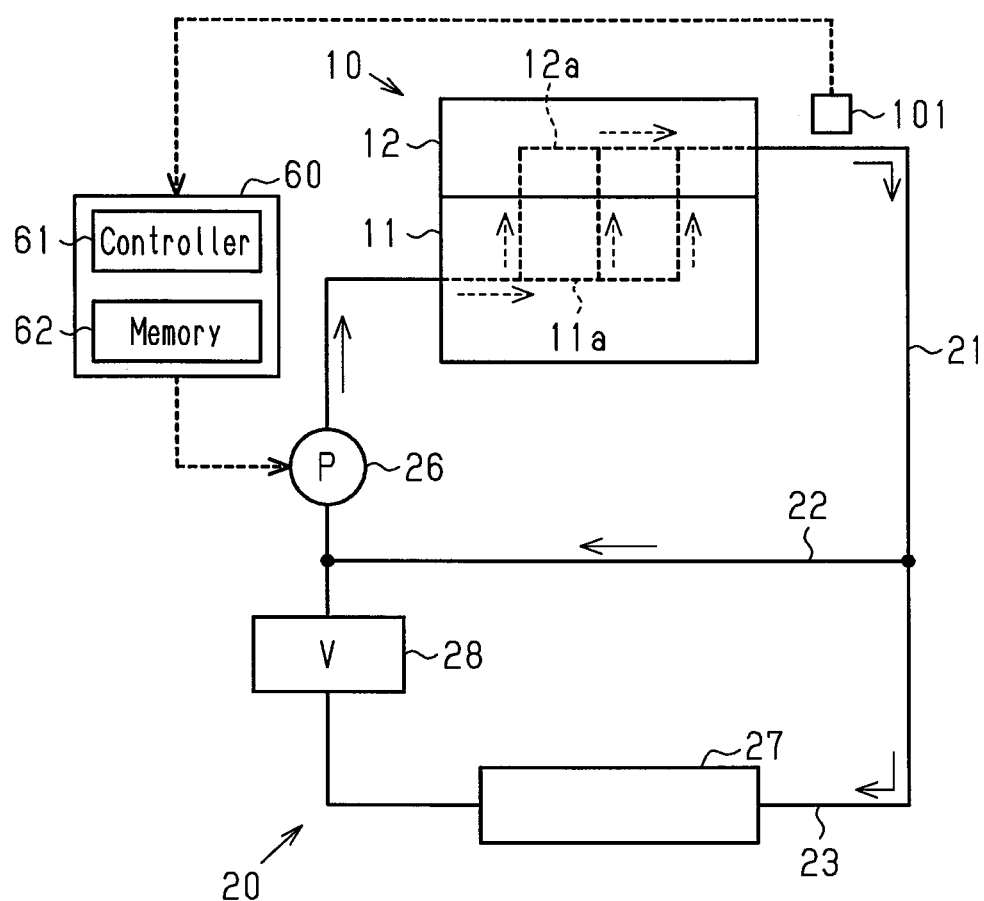
FIG. 1 is a schematic diagram showing a cooling apparatus for an internal combustion engine according to an embodiment.

As shown in FIG. 1, the cooling apparatus 20 includes a circulation circuit 21, through which coolant flows. The coolant flows through a water jacket 11*a* in a cylinder block 11 of the internal combustion engine 10 and through a water jacket 12a in a cylinder head 12. The circulation circuit 21 is provided with an electric pump 26, which discharges coolant toward the water jacket 11a in the cylinder block 11. The circulation circuit 21 includes a radiator 27 and a flow rate adjustment valve 28, which are arranged in series with the pump 26. The flow rate adjustment valve 28 is configured to adjust a radiator flow rate RFR, which is the amount of coolant passing through the radiator 27, and is arranged between the radiator 27 and the pump 26. Further, the circulation circuit 21 includes a bypass passage 22. Coolant flows through the bypass passage 22 so as to bypass the radiator 27 and the flow rate adjustment valve 28.

In FIG. 1, the flow of coolant in the water jacket 11a of the cylinder block 11 and the water jacket 12a of the cylinder head 12 is shown by the broken arrows. Further, the flow of coolant flowing from the pump 26 toward the cylinder block 11 and the flow of coolant that has been discharged out of the cylinder head 12 are shown by the solid arrows.

The circulation circuit 21 includes a radiator passage 23, which is arranged in parallel to the bypass passage 22. The radiator passage 23 is a coolant-flowing passage including the radiator 27 and the flow rate adjustment valve 28. Coolant passing through the radiator passage 23 and drawn into the pump 26 is cooled by the radiator 27. In contrast, coolant passing through the bypass passage 22 and drawn into the pump 26 is not cooled by the radiator 27. Thus, the temperature of the coolant drawn into the pump 26 through the bypass passage 22 is higher than the temperature of the coolant drawn into the pump 26 through the radiator passage 23.

Figure 3:
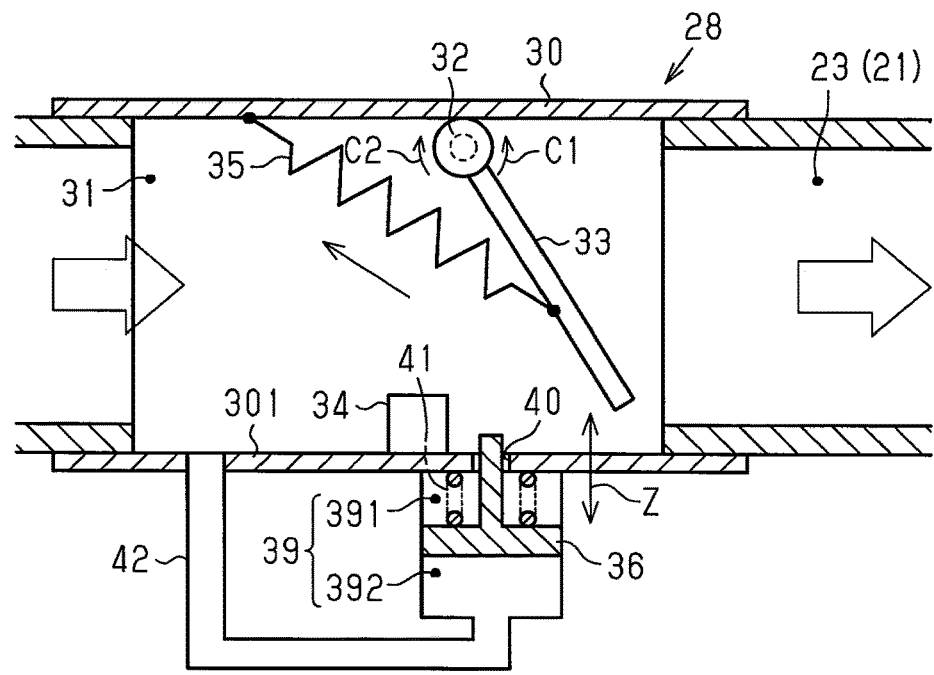
FIG. 3 is a cross-sectional view schematically showing the flow rate adjustment valve.
Figure 4:
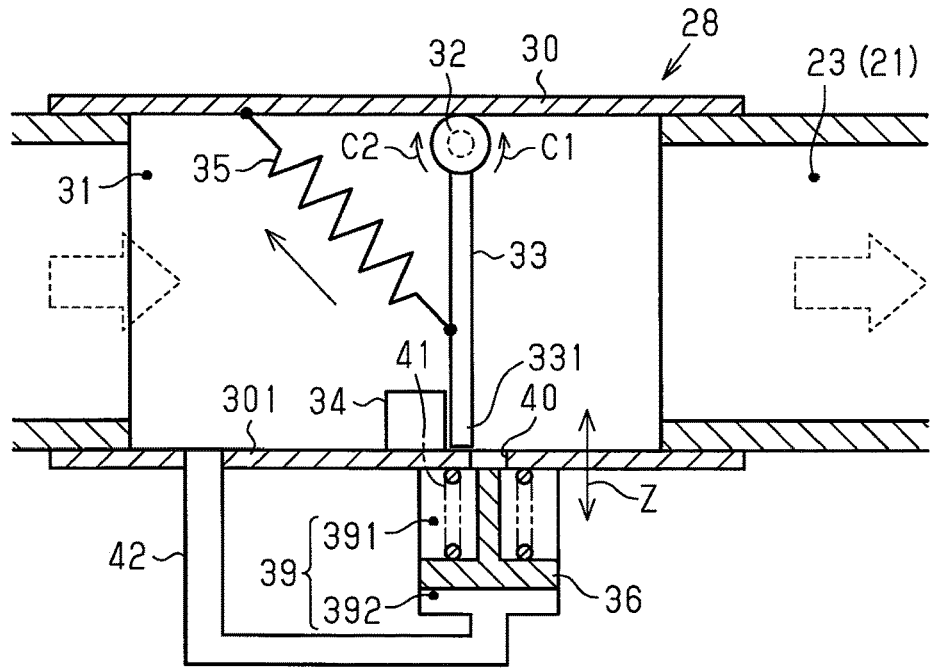
FIG. 4 is a cross-sectional view schematically showing the flow rate adjustment valve.

The flow rate adjustment valve 28 will now be described with reference to FIGS. 2 to 4.

The flow rate adjustment valve 28 includes a tubular housing 30. Coolant that has passed through the radiator 27 flows through the housing 30 in a direction indicated by the white arrows. The housing 30 includes a rotation shaft 32, which is supported by the housing 30, and a valve member 33, which rotates about the rotation shaft 32. The valve member 33 is rotationally supported by the rotation shaft 32. The housing 30 includes a valve accommodation portion 31, which is part of the radiator passage 23 and accommodates the valve member 33.

When the valve member 33 rotates to change the rotation angle of the valve member 33, an open degree V of the flow rate adjustment valve 28 changes. The pressure difference between the upstream side and the downstream side of the valve member 33 in the radiator passage 23 is defined as a valve member pressure difference ΔPV. The upstream side of the valve member 33 refers to the left side of the valve member 33, which is closer to the radiator 27, in FIGS. 2 to 5. The downstream side of the valve member 33 refers to the right side of the valve member 33, which is closer to the pump 26, in FIGS. 2 to 5. In this case, when the valve member pressure difference ΔPV increases, the valve member 33 rotates in a direction in which the open degree V of the flow rate adjustment valve 28 increases. This rotation direction of the valve member 33 is defined as a valve-opening direction C1. The rotation direction of the valve member 33 opposite to the valve-opening direction C1 in a direction in which the open degree V decreases is defined as a valve-closing direction C2.

In the present embodiment, the valve member pressure difference ΔPV can be adjusted by controlling a pump drive amount DP, which is a drive amount of the pump 26. More specifically, as the pump drive amount DP increases, the amount of coolant discharged from the pump 26 increases. That is, the pump drive amount DP is a value corresponding to a pump discharge amount, which is the discharge amount of coolant in the pump 26. As the discharge amount of coolant increases, the upstream pressure of the valve member 33 increases in the radiator passage 23. This increases the valve member pressure difference ΔPV.

The flow rate adjustment valve 28 includes a restriction portion 34, which restricts rotation of the valve member 33 in the valve-closing direction C2. The restriction portion 34 restricts rotation of the valve member 33 in the valve-closing direction C2 by engaging the upstream surface of the valve member 33. In the present embodiment, when the open degree V becomes the minimum, the valve member 33 and the restriction portion 34 engage with each other. The open degree V obtained when the rotation of the valve member 33 in the valve-closing direction C2 is restricted by the restriction portion 34 in this manner is defined as a set open degree VA.

Figure 2:
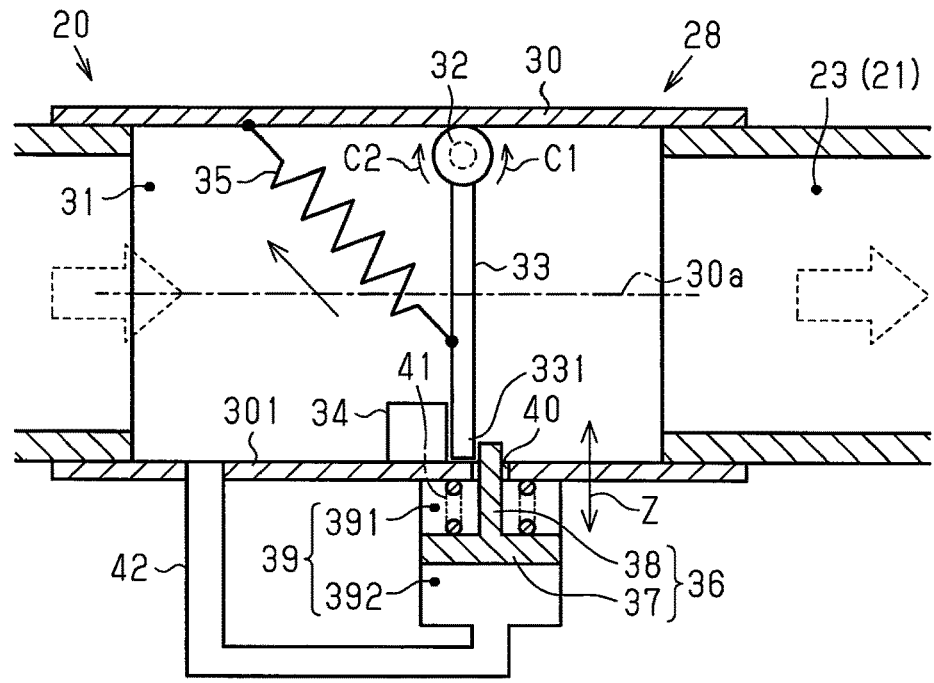
FIG. 2 is a cross-sectional view schematically showing the flow rate adjustment valve of the cooling apparatus.

The flow rate adjustment valve 28 includes a valve member biasing component 35, which biases the valve member 33 in the valve-closing direction C2 as shown by the solid arrow in FIG. 2. Thus, when the valve member pressure difference ΔPV increases, the valve member 33 rotates in the valve-opening direction C1 against a biasing force of the valve member biasing component 35. In contrast, when the valve member pressure difference ΔPV decreases, the valve member 33 rotates in the valve-closing direction C2 against a biasing force of the valve member biasing component 35. When the valve member pressure difference ΔPV decreases in this manner to reach a set pressure difference ΔPVA, the valve member 33 and the restriction portion 34 engage with each other. That is, when the valve member pressure difference ΔPV is less than or equal to the set pressure difference ΔPVA, the open degree V of the flow rate adjustment valve 28 is maintained at the set open degree VA.

Further, a stopper 36 is arranged downstream of the restriction portion 34 in a direction in which coolant flows in the radiator passage 23, that is, arranged between the restriction portion 34 and the pump 26. The stopper 36 moves between a restriction position, where the stopper 36 engages with the valve member 33 to restrict rotation of the valve member 33, and a retraction position, where the stopper 36 does not engage with the valve member 33 and the rotation of the valve member 33 is permitted. The restriction position refers to the position of the stopper 36 shown in FIGS. 2 and 3. The retraction position refers to the position of the stopper 36 shown in FIG. 4. As shown in FIG. 2, when the stopper 36 located at the restriction position engages with the downstream surface of a distal end 331 of the valve member 33, further rotation of the valve member 33 in the valve-opening direction C1 is restricted by the stopper 36 to maintain the open degree V of the flow rate adjustment valve 28. However, even if the stopper 36 is located at the restriction position as shown in FIG. 3, when the distal end 331 of the valve-opening direction C1 is located further in the valve-opening direction C1 than the restriction position, rotation of the valve member 33 in the valve-opening direction C1 is not restricted by the stopper 36. When the stopper 36 is located at the retraction position, the stopper 36 does not engage with the valve member 33 as shown in FIG. 4. That is, the rotation of the valve member 33 is not restricted by the stopper 36.

The flow rate adjustment valve 28 includes a stopper accommodation chamber 39, which is capable of accommodating the stopper 36. The stopper accommodation chamber 39 and the valve accommodation portion 31 are separated from each other by a side wall 301 of the housing 30. That is, the side wall 301 of the housing 30 is a partition wall. As shown by the long dashed double-short dashed line in FIG. 2, the stopper accommodation chamber 39 is located on the opposite side of a central axis 30a of the housing 30 from the rotation shaft 32. The side wall 301 of the housing 30 has an insertion portion 40, which connects the stopper accommodation chamber 39 and the valve accommodation portion 31 to each other. The stopper 36 is inserted through the insertion portion 40.

As shown in FIG. 2, the movement direction of the stopper 36 is defined as a stopper movement direction Z. The stopper 36 is located in the stopper accommodation chamber 39. The stopper 36 includes a base 37, which divides the stopper accommodation chamber 39 into two regions 391 and 392. The stopper 36 also includes a protrusion 38, which protrudes from the base 37. One of the two regions 391 and 392 that is connected to the insertion portion 40 is defined as a first region 391, and the region that differs from the first region 391 is defined as a second region 392. The first region 391 and the second region 392 are laid out in the stopper movement direction Z. The first region 391 is located between the second region 392 and the valve accommodation portion 31 in the stopper movement direction Z.

The protrusion 38 protrudes from the base 37 into the first region 391. The protrusion 38 is inserted through the insertion portion 40 when the stopper 36 moves between the retraction position and the restriction position. When the stopper 36 is located at the restriction position, the protrusion 38 is located in the valve accommodation portion 31 as shown in FIGS. 2 and 3 and is thus engageable with the distal end 331 of the valve member 33. When the stopper 36 is moved from the restriction position to the retraction position, the protrusion 38 of the stopper 36 is moved out of the valve accommodation portion 31 through the insertion portion 40 as shown in FIG. 4.

The flow rate adjustment valve 28 includes a stopper biasing component 41, which biases the stopper 36 toward the retraction position. That is, the stopper biasing component 41 biases the stopper 36 in a direction in which the volume of the first region 391 increases and the volume of the second region 392 decreases. The biasing force of the stopper biasing component 41 is smaller than the biasing force of the valve member biasing component 35. The stopper biasing component 41 is located in the first region 391 of the stopper accommodation chamber 39.

The flow rate adjustment valve 28 includes a connection passage 42, which connects the second region 392 of the stopper accommodation chamber 39 to the space of the radiator passage 23 between the valve member 33 and the radiator 27. Even when the stopper 36 is located at the retraction position as shown in FIG. 4, the connection passage 42 is connected to the second region 392.

As the upstream pressure of the valve member 33 in the radiator passage 23 increases, the pressures of the connection passage 42 and the second region 392 increase. This increases the pressure difference between the second region 392 and the first region 391. Thus, the stopper 36 can be moved in the direction in which the pressure of the second region 392 increases against the biasing force of the stopper biasing component 41. More specifically, when the pressure in the connection passage 42 and the pressure in the second region 392 are less than or equal to a first pressure Pa1, the stopper 36 is maintained at the retraction position by the biasing force of the stopper biasing component 41. When the pressure in the connection passage 42 and the pressure in the second region 392 change from the first pressure Pa1 or lower to a pressure higher than the first pressure Pa1, the stopper 36 moves toward the restriction position against the biasing force of the stopper biasing component 41. When the pressure in the connection passage 42 and the pressure in the second region 392 increase to be greater than or equal to a second pressure Pa2, which is higher than the first pressure Pa1, the stopper 36 reaches the restriction position and is maintained at the restriction position.

Next, the control configuration of the cooling apparatus 20 will be described with reference to FIGS. 1 and 6.

As shown in FIG. 1, the cooling apparatus 20 includes a control device 60. The control device 60 receives detection signals from various sensors such as a water temperature sensor 101. The water temperature sensor 101 detects an outlet water temperature Twt, which is the temperature of coolant that has flowed out of the cylinder head 12, and outputs a signal corresponding to the detected outlet water temperature Twt as a detection signal. The control device 60 is configured to control driving of the pump 26 based on the detection signals of the various sensors including the water temperature sensor 101.

The control device 60 includes a controller 61 and a memory 62. The controller 61 is configured to control the outlet water temperature Twt by controlling the pump drive amount DP, which is a drive amount of the pump 26. As described above, the pump drive amount DP correlates with the pump discharge amount. Thus, in other words, the controller 61 controls the pump discharge amount.

The memory 62 stores two types of lines, namely, a first line MP1 and a second line MP2. The first line MP1 and a second line MP2 indicate the relationship between a circulation coolant amount CR and a radiator flow rate RFR. The first line MP1 of the two lines MP1 and MP2 indicates the relationship between the circulation coolant amount CR and the radiator flow rate RFR when the open degree V of the flow rate adjustment valve 28 changes as the pump drive amount DP changes. The second line MP2 of the two lines MP1 and MP2 differs from the first line MP1. The second line MP2 indicates the relationship between the circulation coolant amount CR and the radiator flow rate RFR when rotation of the valve member 33 in the valve-opening direction C1 is restricted by the stopper 36, that is, when the open degree V is maintained.

The lines MP1 and MP2, which are stored in the memory 62, will now be described with reference to FIG. 6. In FIG. 6, the first line MP1 is represented by the solid line, and the second line MP2 is represented by the broken line.

Figure 6:
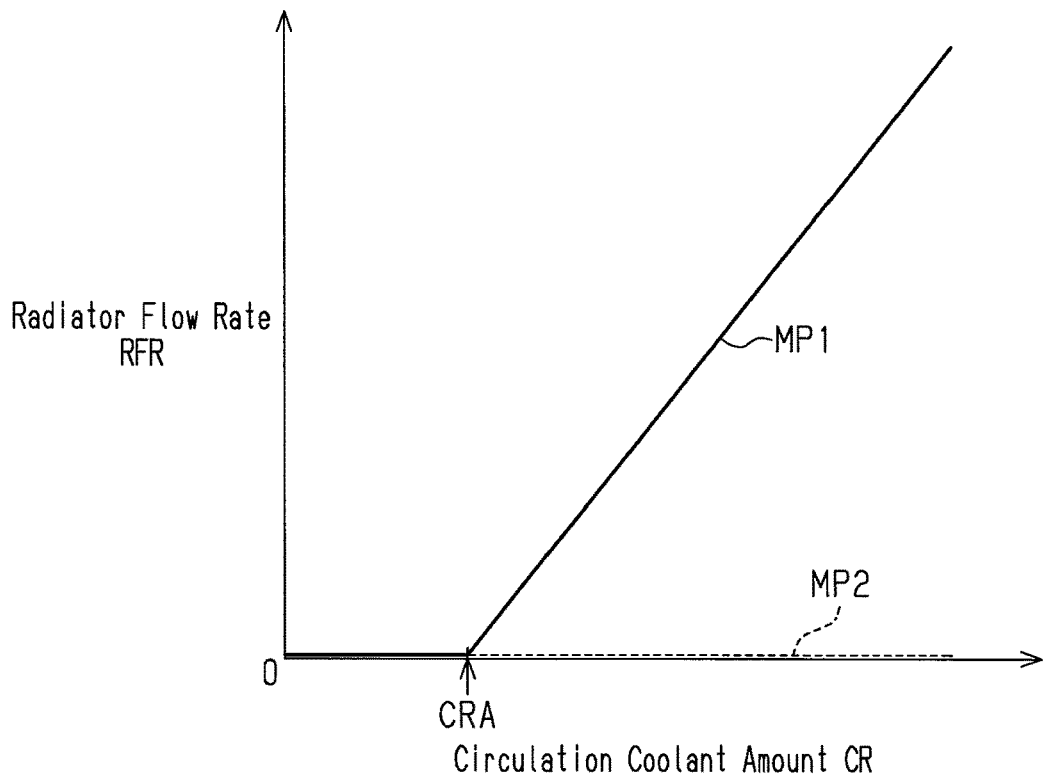
FIG. 6 is a map illustrating the relationship between a radiator flow rate and a circulation coolant amount.

As shown by the broken line in FIG. 6, in the second line MP2, the radiator flow rate RFR is maintained at a set flow rate such as 0 regardless of the circulation coolant amount CR.

As shown by the solid line in FIG. 6, in the first line MP1, the radiator flow rate RFR is maintained at the set flow rate when the circulation coolant amount CR is less than a switch coolant amount CRA. This is because when the circulation coolant amount CR is less than the switch coolant amount CRA, the open degree V of the flow rate adjustment valve 28 is maintained at the set open degree VA by the biasing force of the valve member biasing component 35. When the circulation coolant amount CR is greater than or equal to the switch coolant amount CRA, the radiator flow rate RFR increases as the circulation coolant amount CR increases. This is because when the circulation coolant amount CR is greater than or equal to the switch coolant amount CRA, the valve member 33 rotates in the valve-opening direction C1 against the biasing force of the valve member biasing component 35 to increase the open degree V as the circulation coolant amount CR increases. Thus, the first line MP1 indicates a relationship in which the circulation coolant amount CR is larger when the radiator flow rate RFR is large than when the radiator flow rate RFR is small.

As the pump drive amount DP increases, the circulation coolant amount CR increases. As the circulation coolant amount CR increases, the upstream pressure of the valve member 33 in the radiator passage 23 increases, that is, the valve member pressure difference ΔPV increases. That is, the valve member pressure difference ΔPV correlates with the circulation coolant amount CR. Thus, the switch coolant amount CRA is equal to the circulation coolant amount CR obtained when the valve member pressure difference ΔPV matches the set pressure difference ΔPVA.

The set pressure difference ΔPVA is smaller when a biasing component with a large biasing force is employed as the valve member biasing component 35 than when a biasing component with a small biasing force is employed as the valve member biasing component 35. That is, the switch coolant amount CRA is a value that correlates with the biasing force of the valve member biasing component 35.

Increases in the outlet water temperature Twt become less likely as the circulation coolant amount CR increases. Further, as the proportion of a partial amount of coolant cooled by the radiator 27 increases in the total amount of coolant discharged out of the pump 26, increases in the outlet water temperature Twt become less likely. Thus, when the outlet water temperature Twt is controlled, a target circulation coolant amount RFRTr, which is the target of the radiator flow rate RFR, and a target circulation coolant amount CRTr, which is the target of the circulation coolant amount CR, are calculated such that the outlet water temperature Twt becomes a range within an allowable range. The controller 61 controls the pump drive amount DP based on the target circulation coolant amount RFRTr and the target circulation coolant amount CRTr.

Figure 7:
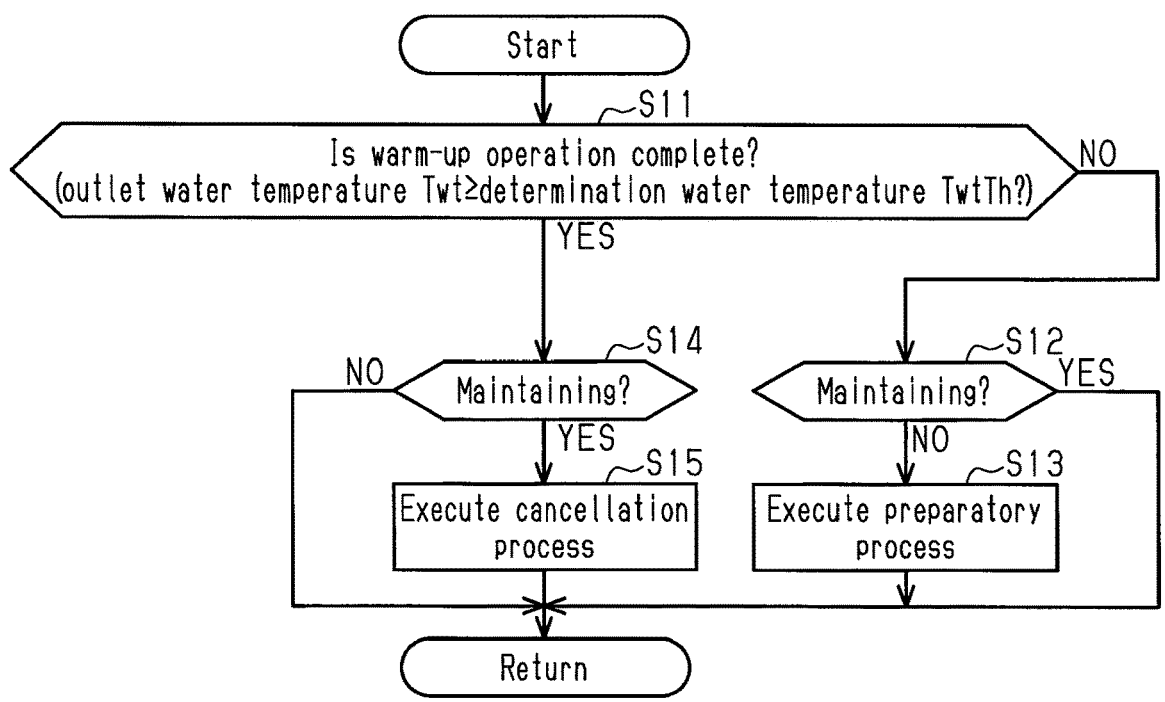
FIG. 7 is a flowchart illustrating a processing routine executed when the flow rate adjustment valve is controlled in accordance with the operating state of the internal combustion engine.

Next, a process routine executed by the controller 61 to control the flow rate adjustment valve 28 will be described with reference to FIG. 7. The processing routine shown in FIG. 7 is repeatedly executed during the engine operation.

In the current processing routine, the controller 61 determines whether a warm-up operation of the internal combustion engine 10 is complete (S11). For example, when the outlet water temperature Twt is greater than or equal to a determination water temperature TwtTh, the controller 61 determines that the warm-up operation is complete. When the outlet water temperature Twt is less than a determination water temperature TwtTh, the controller 61 does not determine that the warm-up operation is complete.

When the controller 61 does not determine that the warm-up operation is complete (S11: NO), the controller 61 determines whether the open degree V of the flow rate adjustment valve 28 is maintained (S12). For example, when there is a history indicating that a preparatory process (described later) has been executed since the beginning of the engine operation, the controller 61 determines that the open degree V is maintained. When there is no history indicating that the preparatory process has been executed since the beginning of the engine operation, the controller 61 does not determine that the open degree V is maintained. When the open degree V is maintained, rotation of the valve member 33 in the valve-opening direction C1 is restricted by the stopper 36. Thus, even if the pump drive amount DP is increased, the controller 61 can determine that an increase in the radiator flow rate RFR can be limited. Accordingly, when the open degree V is maintained (S12: YES), the current processing routine is ended. That is, the open degree V remains maintained.

When the open degree V is not maintained (S12: NO), the controller 61 executes the preparatory process (S13). That is, in the preparatory process, the controller 61 moves the stopper 36 to the restriction position after arranging the stopper 36 at the retraction position and arranging the valve member 33 further in the valve-closing direction than the stopper 36 through control of the pump discharge amount DP. The detail of the preparatory process will be described later with reference to FIG. 8. Upon completion of the execution of the preparatory process, the current processing routine is ended.

In step S11, when determining that the warm-up operation is complete (YES), the controller 61 determines whether the open degree V of the flow rate adjustment valve 28 is maintained (S14). For example, when there is no history indicating that a cancellation process (described later) has been executed since the completion of the warm-up operation, the controller 61 determines that the open degree V is maintained. When there is a history indicating that the cancellation process has been executed since the completion of the warm-up operation, the controller 61 does not determine that the open degree V is maintained. When the open degree V is not maintained, the rotation of the valve member 33 in the valve-opening direction C1 is not restricted. Thus, the radiator flow rate RFR can be controlled by controlling the pump drive amount DP. When the open degree V is maintained, rotation of the valve member 33 in the valve-opening direction C1 is restricted by the stopper 36. Thus, even if the pump drive amount DP is increased, the radiator flow rate RFR cannot be increased. As a result, since the coolant discharged out of the pump 26 has a high temperature even if the circulation coolant amount CR is increased, the outlet water temperature Twt may become excessively high. Accordingly, when the open degree V is maintained (S14: YES), the controller 61 executes the cancellation process (S15). That is, in the cancellation process, the controller 61 arranges the stopper 36 at the retraction position and then increases the pump drive amount DP so that the valve member 33 is rotated to a position located further in the valve-opening direction C1 than the stopper 36 before the stopper 36 moves to the restriction position. The detail of the cancellation process will be described later with reference to FIG. 8. Upon completion of the execution of the cancellation process, the current processing routine is ended.

In step S14, when the open degree V is not maintained (NO), the controller 61 ends the current processing routine.

Figure 8:
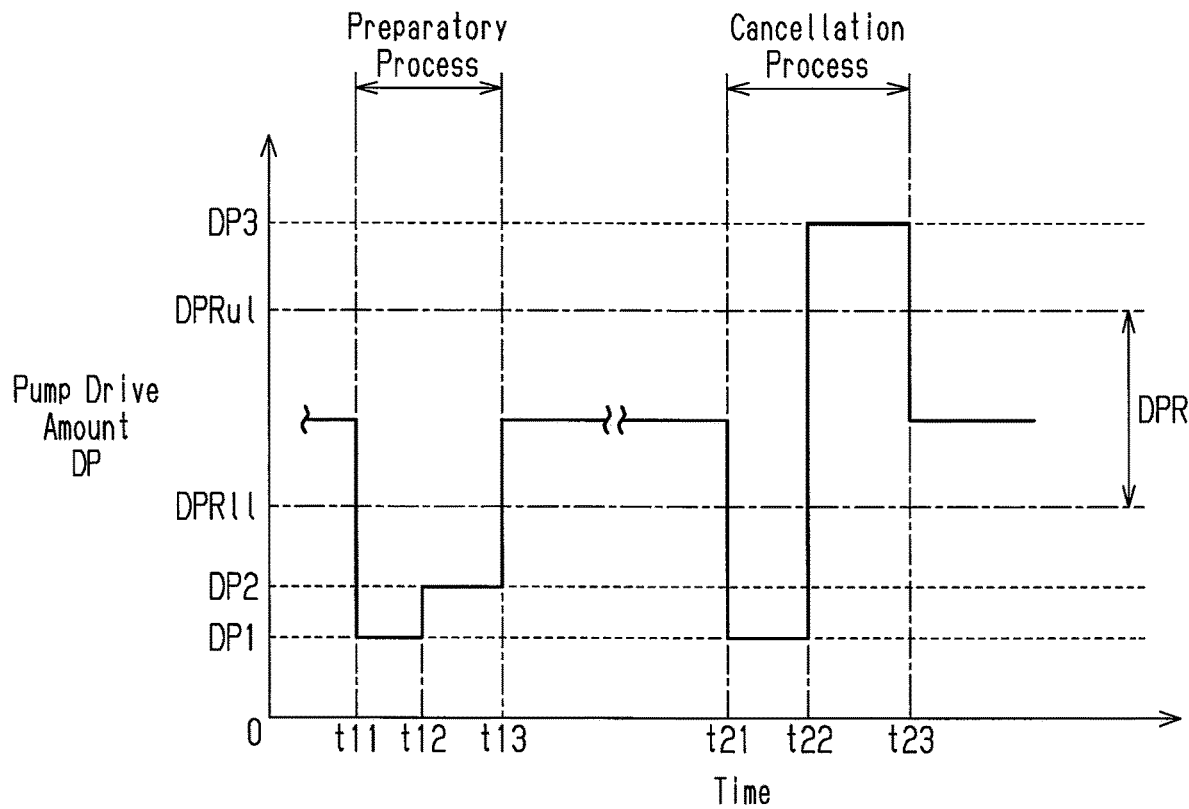
FIG. 8 is a timing diagram illustrating changes in a pump drive amount during execution of a preparatory process and changes in the pump drive amount during execution of a cancellation process.

Next, the preparatory process will be described with reference to FIG. 8. FIG. 8 shows a normal drive region DPR, which refers to a region of the pump drive amount DP that may be set when rotation of the valve member 33 in the valve-opening direction C1 is not restricted by the stopper 36 and the open degree V can be adjusted by adjusting the pump drive amount DP.

At the point in time t11, when the preparatory process is started, the controller 61 changes the pump drive amount DP to a first drive amount DP1. The first drive amount DP1 refers to a pump drive amount corresponding to a first discharge amount. The first drive amount DP1 refers to a value that is smaller than a lower limit DPR11 of the normal drive region DPR. As the pump drive amount DP increases, the discharge amount of coolant of the pump 26 increases. As the discharge amount of coolant of the pump 26 increases, the circulation coolant amount CR increases. That is, the pump drive amount DP correlates with the circulation coolant amount CR. In the present embodiment, the first drive amount DP1 is set to a pump drive amount DP that allows the circulation coolant amount CR to be less than the switch coolant amount CRA.

Thus, when the pump drive amount DP is changed to the first drive amount DP1, the circulation coolant amount CR decreases. Accordingly, in the radiator passage 23, the upstream pressure of the valve member 33 decreases, that is, the valve member pressure difference ΔPV decreases. As the valve member pressure difference ΔPV decreases, the valve member 33 rotates in the valve-closing direction C2 against the biasing force of the valve member biasing component 35. When the circulation coolant amount CR is less than the switch coolant amount CRA and the valve member pressure difference ΔPV is less than or equal to the set pressure difference ΔPVA, the valve member 33 is located further in the valve-closing direction C2 than the stopper 36. This causes the restriction portion 34 to engage with the upstream surface of the distal end 331 of the valve member 33.

Further, when the upstream pressure of the valve member 33 in the radiator passage 23 decreases, the pressure in the connection passage 42 and the pressure in the second region 392 of the stopper accommodation chamber 39 are also decreased by changing the pump drive amount DP to the first drive amount DP1. As a result, the biasing force of the stopper biasing component 41 moves the stopper 36 from the restriction position toward the retraction position. When the upstream pressure of the valve member 33 in the radiator passage 23 decreases, the pressure in the connection passage 42 and the pressure in the second region 392 of the stopper accommodation chamber 39 decrease to the first pressure Pa1 or lower. This moves the stopper 36 to the retraction position. When the pressure in the connection passage 42 and the pressure in the second region 392 remain less than or equal to the first pressure Pa1, the stopper 36 is maintained at the retraction position.

As the pump drive amount DP decreases to a larger extent and the upstream pressure of the valve member 33 in the radiator passage 23 decreases to a larger extent, the valve member 33 rotates in the valve-closing direction C2 at a higher speed. In other words, as the pump drive amount DP decreases to a smaller extent and the upstream pressure of the valve member 33 in the radiator passage 23 decreases to a small extent, increases in the rotation speed of the valve member 33 in the valve-closing direction C2 become less likely.

In the present embodiment, when the pump drive amount DP is changed from a value within the normal drive region DPR to the first drive amount DP1, the upstream pressure of the valve member 33 in the radiator passage 23 decreases relatively gradually. This limits an increase in the rotation speed of the valve member 33 in the valve-closing direction C2. As a result, when the valve member 33 rotates in the valve-closing direction C2 due to a decrease in the valve member pressure difference ΔPV, the valve member 33 is located further in the valve-closing direction C2 than the stopper 36 after the stopper 36 moves to the retraction position.

At the point in time t12, the controller 61 determines that the stopper 36 is located at the retraction position and the valve member 33 is engaged with the restriction portion 34. Thus, the controller 61 changes the pump drive amount DP from the first drive amount DP1 to a second drive amount DP2. The second drive amount DP2 is larger than the first drive amount DP1. The second drive amount DP2 refers to a pump drive amount corresponding to a second discharge amount.

The length of time between the point in time t11 and the point in time t12 is set to time for the valve member 33 and the restriction portion 34 to be engaged with each other by changing the pump drive amount DP to the first drive amount DP1, or time that is slightly longer than that time. As the pump drive amount DP prior to starting the preparatory process increases, the rotation angle of the valve member 33 prior to starting the preparatory process increases. Thus, the time for the valve member 33 and the restriction portion 34 to be engaged with each other is presumably long. Thus, the length of time from the point in time t11 to the point in time t12, that is, the length of time during which the pump drive amount DP is maintained at a value less than or equal to the first drive amount DP1, may be varied in accordance with the pump drive amount DP prior to starting the preparatory process.

As shown in FIG. 8, the second drive amount DP2 is larger than the first drive amount DP1. The second drive amount DP2 is set to a value that satisfies the following two conditions. In the present embodiment, the second drive amount DP2 is set to a value that is smaller than the lower limit DPR 11 of the normal drive region DPR. However, as long as the following two conditions are satisfied, the second drive amount DP2 may be a value greater than or equal to the lower limit DPR 11.

(Condition 1) When the pump drive amount DP is set to the second drive amount DP2, the pressure in the connection passage 42 and the pressure in the second region 392 are set to the second pressure Pa2, which is higher than the first pressure Pa1, such that the stopper 36 can be arranged at the restriction position.

(Condition 2) When the pump drive amount DP is set to the second drive amount DP2, the circulation coolant amount CR is set to remain less than the switch coolant amount CRA such that the valve member 33 can be maintained at a position located further in the valve-closing direction C2 than the stopper 36.

Thus, at the point in time t12, when the pump drive amount DP is changed from the first drive amount DP1 to the second drive amount DP2, the stopper 36 moves from the retraction position to the restriction position with the valve member 33 located further in the valve-closing direction C2 than the stopper 36.

At the point in time t13, the controller 61 determines that the distal end 331 of the valve member 33 is located further in the valve-closing direction C2 than the stopper 36 and the stopper 36 is located at the restriction position. The length of time between the point in time t12 and the point in time t13 is set to time for the stopper 36 to be moved from the retraction position to the restriction position by setting the pump drive amount DP to the second drive amount DP2, or time that is slightly longer than that time. Thus, the controller 61 can determine as described above on the condition that the point in time has reached the point in time t13 after the pump drive amount DP was changed to the second drive amount DP2. At the point in time t13, the controller 61 ends the preparatory process.

Subsequent to the point in time t13, the pump drive amount DP is adjusted within a range of the normal drive region DPR. When the pump drive amount DP is increased from the second drive amount DP2 in such a manner, the downstream surface of the distal end 331 of the valve member 33 engages with the stopper 36 though the valve member 33 attempts to rotate in the valve-opening direction C1. This restricts rotation of the valve member 33 in the valve-opening direction C1 to maintain the open degree V of the flow rate adjustment valve 28.

Next, the cancellation process will be described with reference to FIG. 8.

At the point in time t21, when starting the cancellation process, the controller 61 changes the pump drive amount DP to the first drive amount DP1. This decreases the pressure in the connection passage 42 and the pressure in the second region 392 of the stopper accommodation chamber 39 to the first pressure Pa1 or lower. As a result, the stopper 36 moves from the restriction position to the retraction position. That is, at the point in time t22 or shortly before the point in time t22, the state in which the stopper 36 can restrict rotation of the valve member 33 in the valve-opening direction C1 is cancelled.

At the point in time t22, the controller 61 changes the pump drive amount DP from the first drive amount DP1 to a third drive amount DP3. The third drive amount DP3 refers to a pump drive amount corresponding to a third discharge amount. The third drive amount DP3 is larger than an upper limit DPRu1 of the normal drive region DPR. That is, the third drive amount DP3 is larger than the second drive amount DP2. Thus, the difference between the third drive amount DP3 and the first drive amount DP1 is larger than the difference between the second drive amount DP2 and the first drive amount DP1. The increase speed of the upstream pressure of the valve member 33 in the radiator passage 23 when the pump drive amount DP is changed from the first drive amount DP1 to the second drive amount DP2 like during the execution of the preparatory process is defined as a restriction increase speed. When the pump drive amount DP is changed from the first drive amount DP1 to the third drive amount DP3 as described above, the increase speed of the upstream pressure of the valve member 33 in the radiator passage 23 can be set to be larger than the restriction increase speed. Thus, the increase speed of the valve member pressure difference $\Delta PV$ in this case is larger than the increase speed when the pump drive amount DP is changed from the first drive amount DP1 to the second drive amount DP2. In this manner, as the increase speed of the valve member pressure difference $\Delta PV$ increases, the rotation speed of the valve member 33 in the valve-opening direction C1 increases. As a result, at the point in time t23 or shortly before the point in time t23, the valve member 33 can be arranged further in the valve-opening direction C1 than the stopper 36 before the stopper 36 moves to the restriction position.

At the point in time t23, the controller 61 determines that the valve member 33 is located further in the valve-opening direction C1 than the stopper 36 and the stopper 36 is located at the restriction position. The length of time between the point in time t22 and the point in time t23 is set to time for the valve member 33 to be rotated to a position further in the valve-opening direction C1 than the stopper 36 by setting the pump drive amount DP to the third drive amount DP3, or time that is slightly longer than that time. Thus, the controller 61 can determine as described above on the condition that the point in time has reached the point in time t23 after the pump drive amount DP was changed to the third drive amount DP3. At the point in time t23, the controller 61 ends the cancellation process. Subsequently, the pump drive amount DP is adjusted within a range of the normal drive region DPR.

The operation and advantages of the present embodiment will now be described.

(1) In the present embodiment, the rotation angle of the valve member 33 (i.e., the open degree V of the flow rate adjustment valve 28) is adjusted by varying the valve member pressure difference $\Delta PV$ through the control of the pump drive amount DP. To maintain the open degree V, the preparatory process is executed. Upon the execution of the preparatory process, the stopper 36 is arranged at the retraction position and arranged further in the valve-closing direction C2 than the stopper 36 through the control of the pump drive amount DP. In this state, the stopper 36 is arranged at the restriction position. When the preparatory process ends and then the pump drive amount DP increases, the valve member 33 and the stopper 36 engage with each other while the valve member 33 attempts to rotate in the valve-opening direction C1. As a result, the stopper 36 restricts the rotation of the valve member 33 in the valve-opening direction C1 and thus maintains the open degree V. That is, in the present embodiment, the open degree V can be maintained by arranging the stopper 36, which moves between the retraction position and the restriction position, on the flow rate adjustment valve 28.

(2) The stopper 36 can be moved in the stopper movement direction Z by adjusting the pressure in the connection passage 42 and the pressure in the second region 392 of the stopper accommodation chamber 39. The connection passage 42 is connected to the upstream portion of the valve member 33 in the radiator passage 23. Thus, the pressure in the connection passage 42 and the pressure in the second region 392 of the stopper accommodation chamber 39 can be adjusted by adjusting the upstream pressure of the valve member 33 in the radiator passage 23 through the control of the pump drive amount DP. That is, controlling the pump drive amount DP allows the stopper 36 to move between the retraction position and the restriction position. This eliminates the need for the flow rate adjustment valve 28 to include a dedicated actuator that adjusts the position of the stopper 36.

(3) The stopper 36 is biased toward the retraction position by the stopper biasing component 41. Thus, the stopper 36 can be arranged at the retraction position by controlling the pressure in the connection passage 42 and the pressure in the second region 392 of the stopper accommodation chamber 39 to the first pressure Pa1 or lower. In contrast, the stopper 36 can be arranged at the restriction position by controlling the pressure in the connection passage 42 and the pressure in the second region 392 of the stopper accommodation chamber 39 to be greater than or equal to the second pressure Pa2, which is higher than the first pressure Pa1. That is, the arrangement of the stopper biasing component 41 differentiates the pressure for arranging the stopper 36 at the retraction position from the pressure for arranging the stopper 36 at the restriction position. This improves the operability of the stopper 36 through the control of the pump drive amount DP.

(4) In the present embodiment, to maintain the open degree V of the flow rate adjustment valve 28, the preparatory process is executed. In the preparatory process, the pump drive amount DP is changed to the first drive amount DP1. This decreases the upstream pressure of the valve member 33 in the radiator passage 23 and thus decreases the pressure in the connection passage 42 and the pressure in the second region 392. When the pressure in the connection passage 42 and the pressure in the second region 392 decrease to the first pressure Pa1 or lower, the stopper 36 is moved to the retraction position by the biasing force of the stopper biasing component 41. Further, when the upstream pressure of the valve member 33 in the radiator passage 23 decreases, the valve member pressure difference $\Delta PV$ decreases, thereby rotating the valve member 33 in the valve-closing direction C2. After the stopper 36 is moved to the retraction position, the valve member 33 can be rotated to a position further in the valve-closing direction C2 than the stopper 36.

As a result, the pump drive amount DP is changed to the second drive amount DP2. This maintains the valve member 33 located further in the valve-closing direction C2 than the stopper 36 as shown in FIG. 2 and allows the stopper 36 to move from the retraction position to the restriction position. When the pump drive amount DP is increased in this state, the rotation of the valve member 33 in the valve-opening direction C1 is restricted by the stopper 36. Thus, controlling the pump drive amount DP adjusts the circulation coolant amount CR while limiting the fluctuation of the radiator flow rate RFR.

Figure 5:
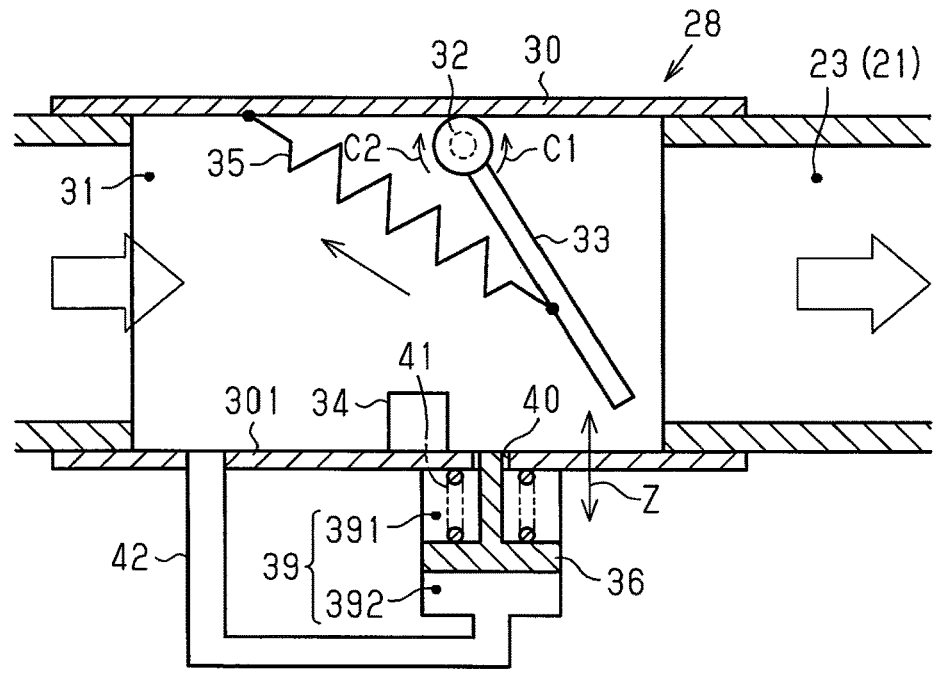
FIG. 5 is a cross-sectional view schematically showing the flow rate adjustment valve.

(5) To cancel the state in which the open degree V of the flow rate adjustment valve 28 is maintained, the cancellation process is executed. In the cancellation process, the pump drive amount DP is changed to the first drive amount DP1. This moves the stopper 36 to the retraction position as shown in FIG. 4. With the stopper 36 located at the retraction position, the pump drive amount DP is changed from the first drive amount DP1 to the third drive amount DP3. This immediately increases the upstream pressure of the valve member 33 in the radiator passage 23. That is, the valve member pressure difference ΔPV increases suddenly. As a result, before the valve member 33 moves from the retraction position to the restriction position as shown in FIG. 5, the stopper 36 can be arranged further in the valve-opening direction C1 than the stopper 36 by the rotation of the valve member 33 in the valve-opening direction C1. Then, after the valve member 33 is arranged at a position further in the valve-opening direction C1 than the stopper 36, the stopper 36 moves to the restriction position as shown in FIG. 3. When the cancellation process is ended in this state, the rotation angle of the valve member 33 can be changed by varying the valve member pressure difference ΔPV through the control of the pump drive amount DP. That is, the radiator flow rate RFR can be adjusted.

(6) Controlling the pump drive amount DP to the first drive amount DP1 rotates the valve member 33 in the valve-closing direction C2. When the valve member 33 and the restriction portion 34 engage with each other, further rotation of the valve member 33 in the valve-closing direction C2 is restricted. Thus, when the pump drive amount DP is set to the first drive amount DP1, the valve member 33 is prevented from being located far away from the stopper 36. Accordingly, when the cancellation process is executed, the valve member 33 is less likely to get caught by the stopper 36 moving toward the restriction position when the valve member 33 is rotated to a position further in the valve-opening direction C1 than the stopper 36.

(7) In the present embodiment, the radiator passage 23 includes both the radiator 27 and the flow rate adjustment valve 28. Thus, when the warm-up operation of the internal combustion engine 10 is not yet complete, the radiator flow rate RFR can be maintained relatively small by maintaining the open degree V of the flow rate adjustment valve 28. This increases the temperature of coolant flowing through the circulation circuit 21 at an early stage.

After the warm-up operation of the internal combustion engine 10 is complete, the radiator flow rate RFR can be adjusted by adjusting the open degree V of the flow rate adjustment valve 28. This controls the temperature of coolant during the engine operation and the amount of coolant flowing through the circulation circuit 21.

The above-described embodiment may be modified as follows. The above-described embodiments and the following modifications can be combined as long as the combined modifications remain technically consistent with each other.

Even when the warm-up operation of the internal combustion engine 10 is not yet complete, rotation of the valve member 33 in the valve-opening direction C1 does not have to be restricted by the stopper 36. Even when the rotation of the valve member 33 in the valve-opening direction C1 is not restricted by the stopper 36, as long as the circulation coolant amount CR is controlled to the switch coolant amount CRA or smaller, the temperature of coolant flowing through the circulation circuit 21 can be readily increased.

As long as the cancellation process is executed so that the valve member 33 can rotate to a position further in the valve-opening direction C1 than the restriction position before the stopper 36 moves to the restriction position, the third drive amount DP3 may be a value smaller than the upper limit DPRu1.

As long as the valve member 33 is rotated in the valve-closing direction C2 to engage with the restriction portion 34 and the stopper 36 can be moved to the retraction position, the first drive amount DP1 may be a value greater than or equal to the lower limit DPR 11 of the normal drive region DPR. When the first drive amount DP1 is a value greater than or equal to the lower limit DPR 11 in such a manner, the second drive amount DP2 is set to a value larger than the lower limit DPR 11.

In the flow rate adjustment valve 28 of the above-described embodiment, the stopper 36 is moved between the restriction position and the retraction position by adjusting the pressure in the connection passage 42. However, as long as the flow rate adjustment valve includes a stopper that moves between the restriction position and the retraction position, the flow rate adjustment valve may be a valve with a structure that differs from the structure of the flow rate adjustment valve 28 of the above-described embodiment. For example, the flow rate adjustment valve may be a valve that includes an actuator that outputs a drive force to a stopper and drives the actuator to move the stopper between the restriction position and the retraction position. In this case, the actuator may be controlled by the controller 61. This allows rotation of the valve member 33 and movement of the stopper to occur at the same time. In the configuration in which the stopper is moved by operating the actuator in this manner, the flow rate adjustment valve may include a holder that maintains the stopper at the restriction position when the stopper is moved to the restriction position by driving the actuator. This limits an increase in the power consumption when the open degree V of the flow rate adjustment valve is maintained.

In the configuration in which the stopper is moved by operating the actuator, as long as the valve member 33 rotates in the valve-opening direction C1 when the valve member pressure difference ΔPV increases and rotates in the valve-closing direction C2 when the valve member pressure difference ΔPV decreases, the flow rate adjustment valve does not have to includes the valve member biasing component 35.

In the above-described embodiment, the minimum value of the open degree V of the flow rate adjustment valve 28 is the set open degree VA. As long as fluctuation in the radiator flow rate RFR can be limited by maintaining the open degree V at the set open degree VA, the set open degree VA may be set to a value larger than the minimum value of the open degree V.

The flow rate adjustment valve 28 may be arranged upstream of the radiator 27 in the radiator passage 23.

The electric pump 26 does not have to be used as long as the pump can change the discharge amount of coolant. For example, a pump including an engine-driven pump and a valve that operates to adjust the discharge amount of coolant from a coolant discharge portion may be used. In this case, the controller 61 controls operation of the valve to control the pump discharge amount.

Figure 9:
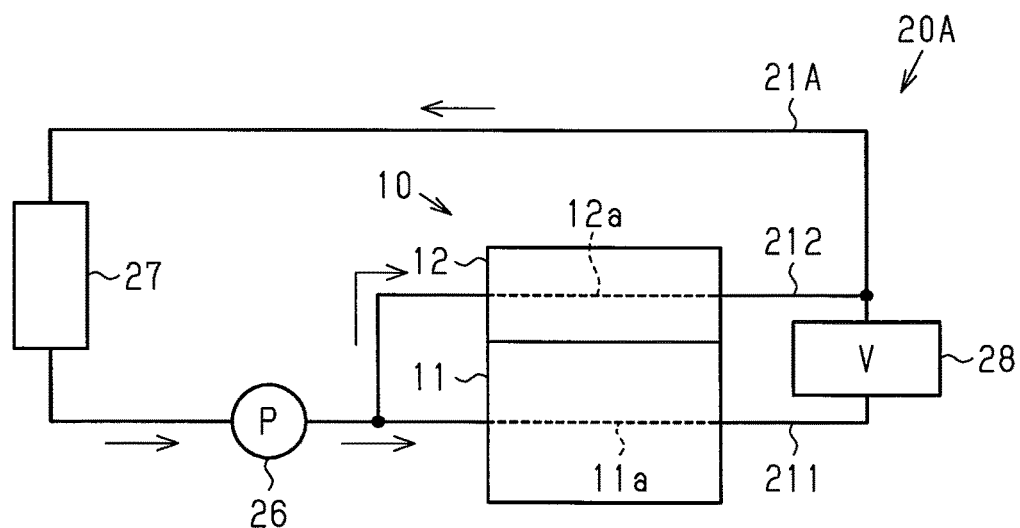
FIG. 9 is a diagram schematically showing the configuration of a cooling apparatus for an internal combustion engine according to a modification.

In the cooling apparatus, as long as the flow rate adjustment valve 28 is arranged in series with the pump, the flow rate adjustment valve 28 may be arranged at a position that differs from the position of the radiator passage 23. Such a cooling apparatus includes, for example, a cooling apparatus 20A as shown in FIG. 9. As shown in FIG. 9, the cooling apparatus 20A includes a circulation circuit 21A. The circulation circuit 21A includes a first coolant passage 211, through which coolant discharged from the electric pump 26 flows into the cylinder block 11, and a second coolant passage 212, through which coolant discharged from the electric pump 26 flows into the cylinder head 12. In the circulation circuit 21A, the coolant that has flowed through the first coolant passage 211 merges with the coolant that has flowed through the second coolant passage 212 to flow toward the radiator 27. The flow rate adjustment valve 28 is arranged on the first coolant passage 211 of the circulation circuit 21A. In this case, the flow rate adjustment valve 28 is located in series with the pump 26. Thus, the rotation angle of the valve member 33 of the flow rate adjustment valve 28 (i.e., open degree V) can be adjusted in accordance with the pump drive amount DP. Additionally, using the stopper 36 to restrict the rotation of the valve member 33 in the valve-opening direction C1 limits fluctuation in the amount of coolant flowing through the cylinder block 11 and adjusts the amount of coolant flowing through the cylinder head 12.

The controller 60 and the controller 61 are not limited to a device that includes a CPU and a memory and executes software processing. For example, at least part of the processes executed by the software in the above-described embodiment may be executed by hardware circuits dedicated to execution of these processes (such as ASIC). That is, the controller 60 and the controller 61 may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A cooling apparatus for an internal combustion engine, the cooling apparatus comprising:
   a circulation circuit for coolant flowing through the internal combustion engine;
   a pump arranged on the circulation circuit, the pump being configured to change a discharge amount of the coolant;
   a flow rate adjustment valve arranged on the circulation circuit in series with the pump; and
   a controller configured to control a pump discharge amount that is the discharge amount of the coolant in the pump, wherein
   the flow rate adjustment valve includes
      a valve member configured to rotate to change an open degree of the flow rate adjustment valve, and
      a stopper that moves between a restriction position at which the stopper engages with the valve member to restrict rotation of the valve member and a retraction position at which the stopper does not engage with the valve member and the rotation of the valve member is permitted,
   the valve member is configured to rotate in a valve-opening direction that is a rotation direction in which the open degree increases when a pressure difference increases between a position upstream of the valve member and a position downstream of the valve member in a flow direction of the coolant in the circulation circuit and rotate in a valve-closing direction that is a rotation direction in which the open degree decreases when the pressure difference decreases, and
   the controller is configured to execute, when maintaining the open degree, a preparatory process of moving the stopper to the restriction position after arranging the stopper at the retraction position and arranging the valve member further in the valve-closing direction than the stopper through control of the pump discharge amount.

2. The cooling apparatus according to claim 1, wherein the flow rate adjustment valve includes
   a valve member biasing component that biases the valve member in the valve-closing direction,
   a valve accommodation portion that is part of the circulation circuit and accommodates the valve member,
   a stopper accommodation chamber separated from the valve accommodation portion by a partition wall,
   an insertion portion arranged in the partition wall, wherein the insertion portion connects the valve accommodation portion and the stopper accommodation chamber to each other, the stopper is inserted through the insertion portion, and
   a connection passage connecting the stopper accommodation chamber to a portion of the circulation circuit located upstream of the valve member in the flow direction of the coolant, and
   the stopper moves toward the restriction position when pressure in the communication passage increases and moves toward the retraction position when the pressure in the communication passage decreases.

3. The cooling apparatus according to claim 2, wherein
the flow rate adjustment valve includes a stopper biasing component that biases the stopper toward the retraction position, and
the stopper is located at the retraction position when the pressure in the communication passage is less than or equal to a first pressure and located at the restriction position against a biasing force of the stopper biasing component when the pressure in the communication passage is greater than or equal to a second pressure that is higher than the first pressure.

4. The cooling apparatus according to claim 3, wherein
the valve member biasing component is configured to rotate the valve member to a position further in the valve-closing direction than the stopper when the pressure difference between the position upstream of the valve member and the position downstream of the valve member in the flow direction of the coolant in the circulation circuit becomes less than or equal to a set pressure difference,
the pressure difference between the position upstream of the valve member and the position downstream of the valve member in the flow direction of the coolant is less than or equal to the set pressure difference when the pump discharge amount is less than or equal to a first discharge amount, and
when the pump discharge amount changes from a value larger than the first discharge amount to a value less than or equal to the first discharge amount, the pressure in the connection passage becomes less than or equal to the first pressure before the pressure difference becomes less than or equal to the set pressure difference.

5. The cooling apparatus according to claim 3, wherein the controller is configured to, in the preparatory process;
arrange the stopper at the retraction position and arrange the valve member further in the valve-closing direction than the stopper by decreasing the pump discharge amount to the first discharge amount or lower; and then
move the stopper from the retraction position to the restriction position by increasing the pump discharge amount to a second discharge amount that is larger than the first discharge amount.

6. The cooling apparatus according to claim 5, wherein the controller is configured to execute, when cancelling a state in which the open degree is maintained, a cancellation process of arranging the stopper at the retraction position by decreasing the pump discharge amount to the first discharge amount or lower and then changing the pump discharge amount from a value less than or equal to the first discharge amount to a third discharge amount that is larger than the second discharge amount.

7. The cooling apparatus according to claim 5, wherein
an increase speed of the pressure difference between the position upstream of the valve member and the position downstream of the valve member in the flow direction of the coolant in the circulation circuit when the preparatory process is executed to increase the pump discharge amount to the second discharge amount is defined as a restriction increase speed, and
the controller is configured to execute, when cancelling a state in which the open degree is maintained, a cancellation process of arranging the stopper at the retraction position by decreasing the pump discharge amount to the first discharge amount or lower and then increasing the pressure difference at an increase speed that is higher than the restriction increase speed by increasing the pump discharge amount.

8. The cooling apparatus according to claim 4, further comprising a restriction portion arranged upstream of the stopper in the flow direction of the coolant in the circulation circuit, the restriction portion restricting further rotation of the valve member in the valve-closing direction by engaging with the valve member that has rotated in the valve-closing direction.

9. The cooling apparatus according to claim 1, further comprising:
a radiator arranged on the circulation circuit in series with the pump and the flow rate adjustment valve; and
a bypass passage through which the coolant flows so as to bypass the radiator and the flow rate adjustment valve.

10. The cooling apparatus according to claim 9, wherein the controller is configured to:
restrict rotation of the valve member in the valve-opening direction with the stopper by arranging the stopper at the restriction position when a warm-up operation of the internal combustion engine is not complete; and
adjust the open degree by controlling the pump discharge amount when the warm-up operation of the internal combustion engine is complete.

* * * * *